United States Patent
Cook et al.

(10) Patent No.: US 9,648,804 B2
(45) Date of Patent: May 16, 2017

(54) KNIFE ARM ASSEMBLY FOR A SICKLE

(75) Inventors: Joel T. Cook, Lititz, PA (US); George E. Korlinchak, New Holland, PA (US)

(73) Assignee: CNH Industrial America LLC, New Holland, PA (US)

( * ) Notice: Subject to any disclaimer, the term of this patent is extended or adjusted under 35 U.S.C. 154(b) by 66 days.

(21) Appl. No.: 14/128,077

(22) PCT Filed: May 29, 2012

(86) PCT No.: PCT/US2012/039842
§ 371 (c)(1),
(2), (4) Date: Apr. 1, 2014

(87) PCT Pub. No.: WO2012/166721
PCT Pub. Date: Dec. 6, 2012

(65) Prior Publication Data
US 2014/0215995 A1    Aug. 7, 2014

Related U.S. Application Data

(60) Provisional application No. 61/491,072, filed on May 27, 2011.

(51) Int. Cl.
*A01D 34/14* (2006.01)
(52) U.S. Cl.
CPC ................... *A01D 34/145* (2013.01)
(58) Field of Classification Search
CPC ...... A01D 34/30; A01D 34/145; A01D 34/02; A01D 34/135; A01D 34/14; A01D 34/32; A01D 34/33; A01D 34/34; A01D 34/404; A01B 71/04; A01B 71/08; A01B 45/023; F16C 17/02; F16C 43/02; A01G 2003/0461
See application file for complete search history.

(56) References Cited

U.S. PATENT DOCUMENTS

| | | |
|---|---|---|
| RE8,290 E | 6/1878 | Colahan |
| 1,565,171 A | 12/1925 | Livesay |
| 1,808,469 A | 6/1931 | Lothrop |
| 1,863,343 A | 6/1932 | Kunkle et al. |
| 2,258,517 A * | 10/1941 | Rose ............. A01D 34/30 56/296 |

(Continued)

FOREIGN PATENT DOCUMENTS

| | | |
|---|---|---|
| DE | 1043697 B | 11/1958 |
| JP | S577914 U | 1/1982 |
| SU | 1269763 A1 | 11/1986 |

*Primary Examiner* — Robert Pezzuto
*Assistant Examiner* — Adam Behrens
(74) *Attorney, Agent, or Firm* — Patrick M. Sheldrake

(57) ABSTRACT

The knife arm assembly for connecting a sickle drive to the knife of a sickle, has a knife arm including a cavity and an opening at one end that holds a bearing for receiving a knife pin of the sickle, and a shoulder extending at least partially about and defining a second opening at an opposite end of the cavity smaller than the first opening, and a plug disposed in the second end of the cavity adjacent the end of the bearing and enclosing the second opening, the plug being configured to be forceably movable through the cavity toward the first opening and against the bearing for forcing the bearing from the knife arm, providing easy serviceability, protection from dirt, dust, and other contaminants.

19 Claims, 14 Drawing Sheets

(56) References Cited

U.S. PATENT DOCUMENTS

| | | | | |
|---|---|---|---|---|
| 2,535,878 A * | 12/1950 | Swenson | ................ | A01D 34/13 384/157 |
| 2,621,521 A * | 12/1952 | Lewis | ................... | A01D 34/30 30/218 |
| 2,791,085 A * | 5/1957 | Lewis | ................... | A01D 34/30 56/296 |
| 3,157,018 A * | 11/1964 | Toffin | ................... | A01D 34/30 56/296 |
| 3,397,584 A * | 8/1968 | Koch | ................... | A01D 34/30 403/221 |
| 3,444,676 A * | 5/1969 | Bernhardt | ............. | A01D 34/30 56/296 |
| 3,823,534 A | 7/1974 | Bornzin et al. | | |
| 3,896,610 A * | 7/1975 | Hiniker | ................. | A01D 41/14 56/15.8 |
| 3,945,737 A * | 3/1976 | Herbenar | ............. | F16C 11/083 403/132 |
| 4,023,333 A | 5/1977 | Anderson | | |
| 4,198,803 A * | 4/1980 | Quick | ................... | A01D 34/13 56/296 |
| 4,272,948 A | 6/1981 | Dolberg et al. | | |
| 4,342,186 A | 8/1982 | Stikeleather et al. | | |
| 4,418,520 A | 12/1983 | Schneider et al. | | |
| 5,028,163 A * | 7/1991 | Krieg | ...................... | B62D 7/16 403/131 |
| 5,165,169 A | 11/1992 | Boyce | | |
| 5,212,936 A | 5/1993 | Lauritsen | | |
| 5,330,284 A | 7/1994 | Persson | | |
| 5,607,249 A * | 3/1997 | Maughan | ................. | B62D 7/16 403/120 |
| 5,865,016 A | 2/1999 | Toman | | |
| 6,139,261 A * | 10/2000 | Bishop | ..................... | F16C 3/00 384/281 |
| 6,671,959 B1 | 1/2004 | Skaggs | | |
| 6,854,917 B2 * | 2/2005 | Kraine, Jr. | ............. | B60G 7/001 280/124.127 |
| 7,121,074 B1 | 10/2006 | Regier et al. | | |
| 7,743,592 B2 | 6/2010 | Schumacher et al. | | |
| 8,151,547 B2 * | 4/2012 | Bich | ....................... | A01D 34/30 56/158 |
| 8,608,399 B2 * | 12/2013 | Schumacher | .......... | A01D 34/33 384/558 |
| 2007/0164624 A1* | 7/2007 | Horng | .................... | F16C 17/02 310/90 |
| 2007/0209345 A1* | 9/2007 | Schumacher | .......... | A01D 34/33 56/12.6 |
| 2009/0145096 A1* | 6/2009 | Priepke | ................. | A01D 41/142 56/257 |
| 2011/0078989 A1* | 4/2011 | Bich | ..................... | A01D 34/145 56/14.5 |
| 2011/0099964 A1* | 5/2011 | Coers | ................... | A01D 34/30 56/296 |

* cited by examiner

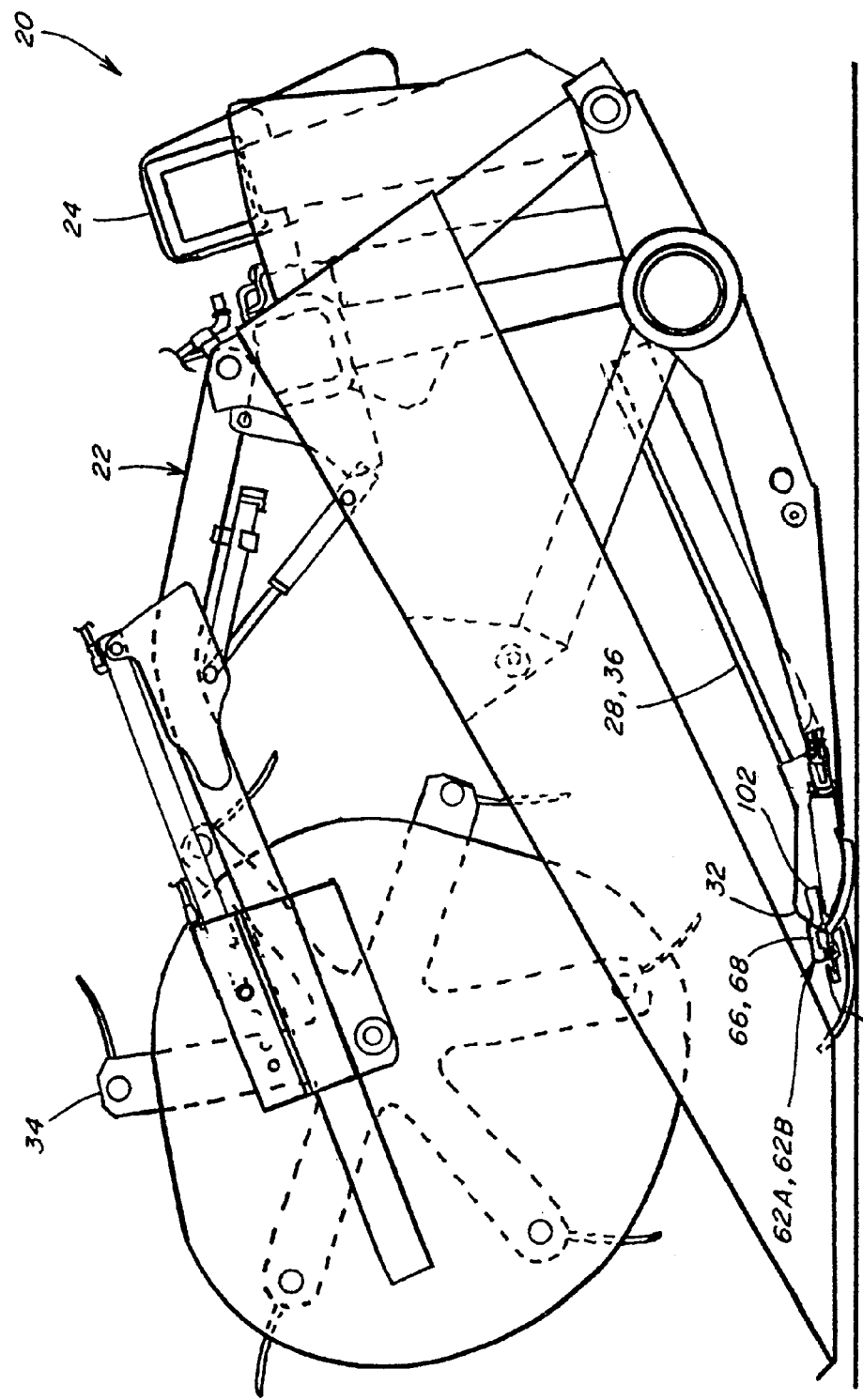

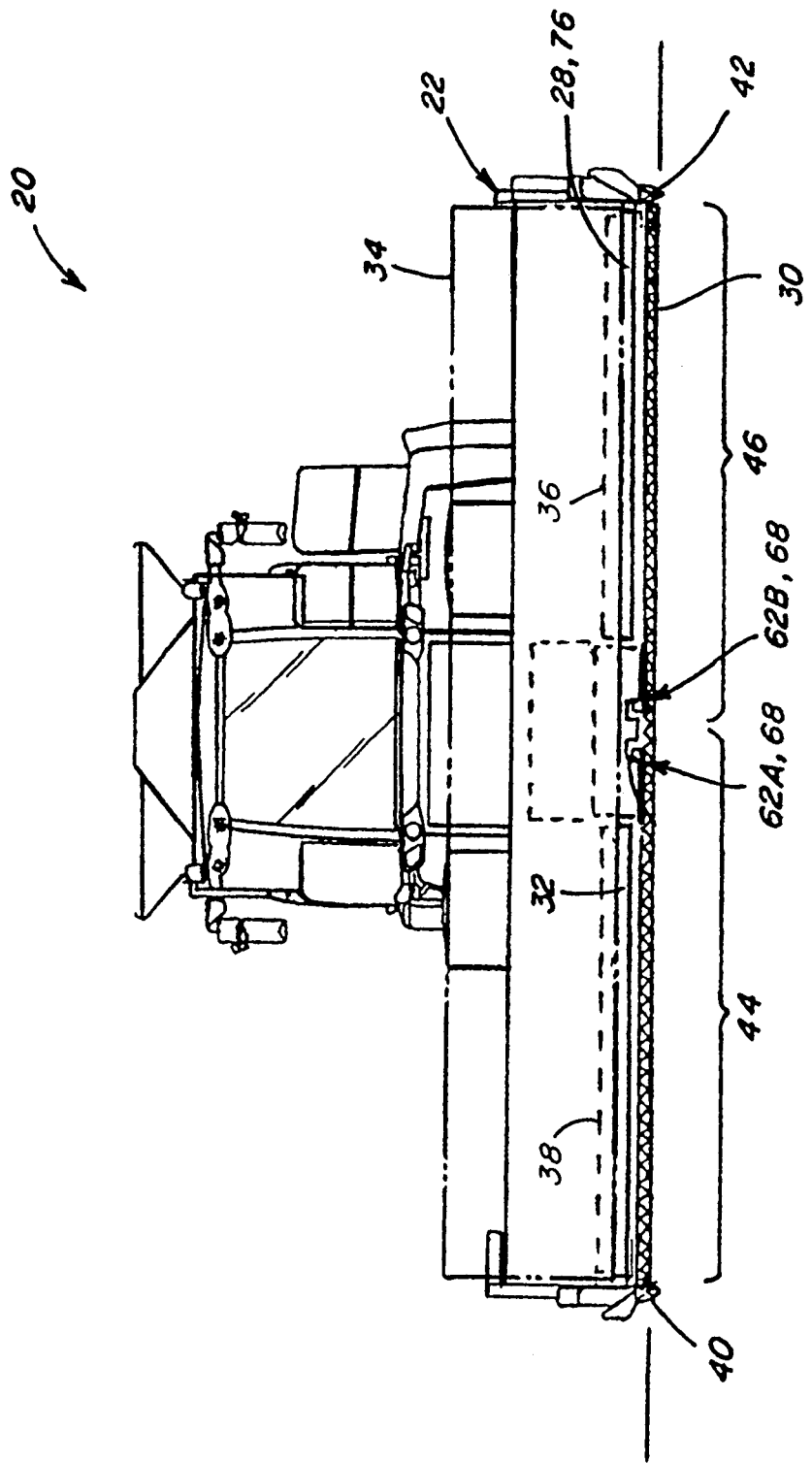

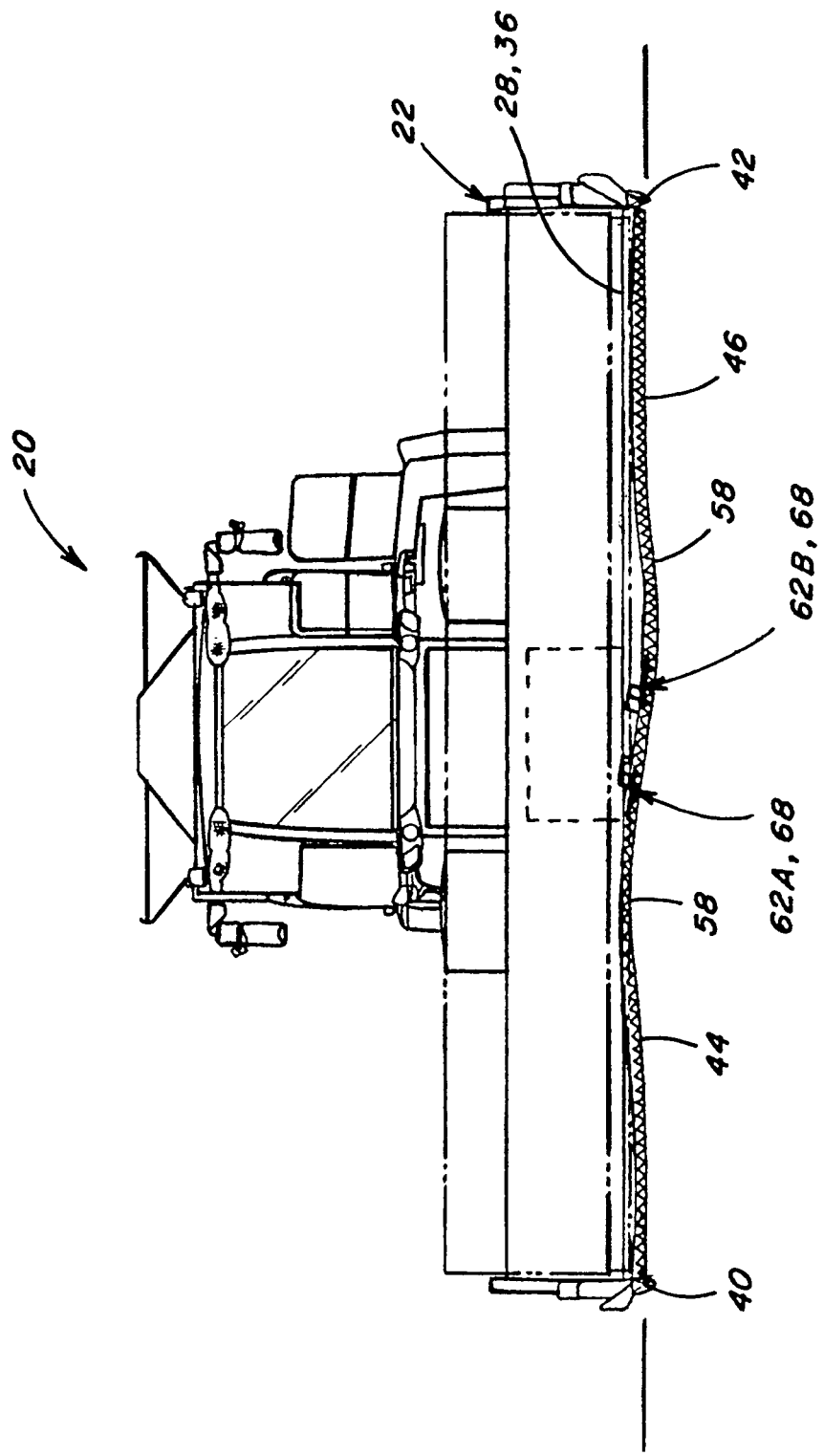

KNIFE ARM ASSEMBLY FOR A SICKLE

This application is the US National Stage for International Application No. PCT/US2012/039842, filed on May 29, 2012, which itself is related to and claims the benefit of U.S. Provisional Application No. 61/491,072 filed May 27, 2011.

TECHNICAL FIELD

This invention relates generally to a knife arm assembly for the sickle of a header of an agricultural cutting machine, such as a combine, windrower or other crop harvesting machine, or a mower, and more particularly, for connecting a sickle knife assembly to a driven element of a drive mechanism, which is easily serviceable, provides protection from dirt, dust, and other contaminants, can be vertically self adjusting, and can reduce downtime for repair and replacement of components expected to wear over time.

BACKGROUND ART

The disclosure of U.S. Provisional Application No. 61/491,072, filed May 27, 2011, is hereby incorporated herein in its entirety by reference.

Sickles typically including cutter bars supporting a row of knives, have been used to cut plants, including, but not limited to, hay, grasses, small grains and the like, for many years.
The knives are composed of a plurality of knife or sickle sections which are mounted in side by side relation forming an elongate metal knife assembly. The elongate knife assembly is normally supported so as to slide longitudinally along an elongate stationary bar that has forwardly projecting, spaced apart guards bolted to a structural beam or knife back. The knife assembly moves back and forth in a reciprocating movement to move the knives relative to the guards so that the leading knife edges of the knives cross over the guards or through slots in the guards. This produces a shearing or cutting action which severs plant stems and stalks or other material captured between the knives and the guards.

In a harvesting machine, such as a combine or windrower, the knife assembly and stationary bar are typically supported in connection with a cutting head or header, and are oriented so as to extend sidewardly along a forward edge portion of structure such as a floor or pan of the header, hereinafter sometimes referred to generally as the floor. The floor or pan defines the lower periphery of a cut crop or plant flow area, which can include conveying apparatus, such as one or more augers or belts, operable in cooperation with a reel in machines so equipped, for conveying the cut plant material and crops, for instance, to a feeder inlet of a combine or windrow forming apparatus of a windrower.

Historically, many known sickle drive mechanisms have been located on the side end of the sickle, and connect to the knife assemblies utilizing connecting rods or Pitman arms, such as illustrated in Wanamaker, U.S. Pat. No. 1,622,299, issued Mar. 29, 1927, and Boyer, U.S. Pat. No. 2,332,840, issued Oct. 26, 1943. An observed shortcoming of these older drives, however, is that the drive rods or arms are obtrusively positioned in the cut plant flow area. The ball joints are advantageous as they accommodate misalignments of the knife assemblies relative to the stationary support structure, but they are inefficient for directing the motive power or drive forces in the desired direction longitudinally along the knife assemblies, that is, sidewardly along the length of the sickle. The referenced constructions also provided little or no protection from infiltration of dirt, dust and the like into interfaces between relatively moving parts, so as to be subject to accelerated wear and reduced service life.

More recent known side located sickle drives are less obtrusive and connect to the end of the knife assembly with a connection that better directs the motive power longitudinally along the knife assemblies. Reference in this regard, Regier et al., U.S. Pat. No. 7,121,074 B1 issued Oct. 17, 2006. An observed advantage of this drive it is that it utilizes epicyclical motion translated to the sideward reciprocating motion by connecting components that allow motion in one plane only, as opposed to the multiple plane motion afforded by the ball joints of the older drives, while allowing for or accommodating slight misalignment of the knife assemblies in the stationary supporting structure, the stationary bar. Also, in the Regier et al. construction, the connecting components most likely to be subject to substantial wear, namely, a pin joint, are replaceable, however, the pin joint appears to lack protection from infiltration of dirt, dust, and the like.

Other more recent sickle drives are adapted to be located in or below the floor or pan of a header or plant cutting machine, as shown in Priepke U.S. Pat. Nos. 7,810,304; 7,805,919; 7,730,709; 7,520,118; and 7,401,458, and Bich U.S. Pat. No. 8,011,272. These drives are compact, and provide an efficient manner of translating epicyclic motion to side to side sickle motion such that the motive forces are directed substantially longitudinally along the knife assemblies. However, these drives utilize knife arms that attach to the sickle knife assemblies with a rigid connection, which does not accommodate or adjust for variances in the vertical distance between the knife assemblies and the drive that can be present as a result of wear, manufacturing and assembly tolerances, and the like. The knife arms of these drives also lack accommodations for misalignments of the knife assembly relative to the fixed support structure, e.g., the stationary bar or knife back.

Reference also Bich et al. U.S. Pat. No. 8,151,547 which discloses a knife arm assembly, configured for attachment to a center drive, which suffers from some of the above referenced shortcomings, include an upwardly facing seal, and a knife head requiring an intermediary member for attachment to the knife, and removal and replacement of the knife pin of which connecting the knife head to the knife arm requires removal of the knife head.

Additionally, in the instances of both the Regier et al. and Priepke types of drives, and the knife head and arm assembly of Bich et al. U.S. Pat. No. 8,151,547, vertical misalignment between the output elements of the drive and the knife assemblies can occur, and if not eliminated or compensated for, can result in accelerated wear, excessive binding, rubbing, and increased power consumption. For instance, as the knife assemblies and supporting structure wear as a result of use, particularly the underside of the knife assemblies and associated support structure, the knives will have a tendency to gradually lower within the stationary support structure, but if they are not allowed to do so in the vicinity of the connection to the driving knife arm, additional stress will be created in the knife arm and head assembly. A known remedy for this problem is to shim or otherwise adjust or compensate for the wear, and if this in not properly done, it can result in the binding and increased wear and power consumption. Also, when a worn knife assembly is replaced by a new one, the new knife assembly may be thicker or otherwise different, and require new adjustment or shimming. Such height compensations, shimming, etc., as well as replacement of components, are time and productivity consuming, and thus can be particularly undesirable during plant cutting and harvesting operations when time is of the essence.

Thus, what is sought is apparatus for connection of a sickle drive to the knife assembly of a sickle which provides good power transmission, ease of removal, service and replacement, can have a vertical self-adjusting capability, and one or more of the other features, while overcoming one or more of the shortcomings and limitations, set forth above.

SUMMARY OF THE INVENTION

What is disclosed is a knife arm assembly for connection of a sickle drive to the knife assembly of a sickle which provides efficient power transmission, ease of removal, service and replacement, vertically self-adjustability, and one or more of the other features, while overcoming one or more of the shortcomings and limitations, set forth above.

According to a preferred aspect of the invention, the knife arm assembly includes a knife arm having a mounting end configured for attachment to the sickle drive mechanism for reciprocating sideward movement therewith and a distal end opposite the mounting end disposed to be supported in cantilever relation to the drive mechanism. The distal end has an inner surface bounding and defining a cavity and a first opening at a first end of the cavity, the first opening and the cavity having a substantially uniform first transverse extent. A bearing element is retained in and occupies at least a substantial portion of the cavity, and has an inner bearing interface surface bounding and defining a receptacle therein and including an open end generally proximate to the first opening. The bearing is configured for cooperatively receiving a knife pin of a knife head of a sickle for relative rotation of the knife arm and the knife head. The knife arm has a shoulder extending at least partially about and defining a second opening at a second end of the cavity opposite the first end, the second opening having a second transverse extent smaller than the first transverse extent. A plug is disposed in the second end of the cavity in sealed relation to the second opening. To achieve the sealed condition, the plug has a third transverse extent marginally larger or smaller than the first transverse extent and larger than the second transverse extent so as to be capable of being press fit into the second end of the cavity in sealed relation to the second opening or so as to sealably engage the shoulder about the second opening, while being restrained from passage therethrough by the shoulder. The plug is configured to be movable toward the first end of the cavity and driven against the bearing element for pressing the bearing element from the cavity through the first opening during service.

As an attendant advantage, the bearing element is removable from the arm through the first opening by application of mild force, such as can be delivered by using a mallet or hammer against a mechanic's socket, or a section of pipe or other element insertable through the second opening and positionable against the plug. The bearing element can be installed through the first opening using a press or interference fit, and this enables quick and easy removal with common tools available in a field service environment.

According to another preferred aspect of the invention, the plug includes a protuberance disposed in closing relation to the second opening which can be configured to further seal that opening, and the bearing element can bear against the plug to hold the plug against the shoulder for maintaining the sealed condition thereabout.

According to another preferred aspect of the invention, the knife arm is removably mounted on a driven element of the reciprocating sickle drive mechanism such that the distal end is disposed in cantilever relation thereto over a knife head of the sickle knife assembly, with an upstanding knife pin of the knife head cooperatively received in the receptacle of the bearing element to allow relative rotation and limited vertical movement of the knife arm and knife head.

According to still another preferred aspect of the invention, the knife pin is mounted in upstanding relation on an elongate, low profile member comprising the knife head attached by an array of fasteners, directly to an elongate structural beam or knife back of the sickle cutter. The sickle knife assembly further preferably comprises a longitudinally extending, side by side array of sickle knife sections disposed between the knife head and the beam or knife back, so as to be securely clamped or captured therebetween. The knife head preferably has holes therein or therethrough, which are aligned with standard mounting holes of the knife sections and beam, and accommodate standard fasteners, so as to eliminate any need for adapters or additional members or fasteners.

According to still another preferred aspect of the invention, the knife pin has an outer surface therearound, e.g., of a cylindrical or other suitable shape, to facilitate disassembly and service, and for allowing limited relative vertical movements of the knife head and knife arm if desired. Thus, for example, this relative vertical movement capability, and the capture or containment of the knife pin, provides an amount of self-adjustment in the relative positions of the knife arm and knife head, essentially to allow the knife head to lower as it and its supporting structure wears, to reduce possible occurrence of stress on components, binding, accelerated wear, power consumption, and the like. If used with a flexible sickle, the capability of the knife head to move vertically relative to the knife arm will allow and facilitate flexing of the sickle in the immediate vicinity of the knife head, which will also reduce binding, wear and power consumption.

According to another preferred aspect of the invention, the distal end of the knife arm has opposite sides that taper divergingly in the rearward direction from the distal end about the receptacle to the mounting end, to provide a streamlined shape for facilitating flow of plant material therepast and reducing plowing and other undesirable effects. This is preferably embodied in the knife arm having a V- or narrow U-shape about the receptacle that tapers sidewardly outwardly to about the width of the element of the driving mechanism to which the knife arm is attached.

BRIEF DESCRIPTION OF THE DRAWINGS

FIG. 2 is an enlarged fragmentary side view of the header and sickle knife head and arm assemblies of the invention;

FIG. 3 is a front view of the harvester and header, showing the location of the sickle knife head and arm assemblies;

FIG. 3A is another front view of the harvester and header, with a sickle of the header flexed;

DETAILED DESCRIPTION OF THE INVENTION

Figure 1:
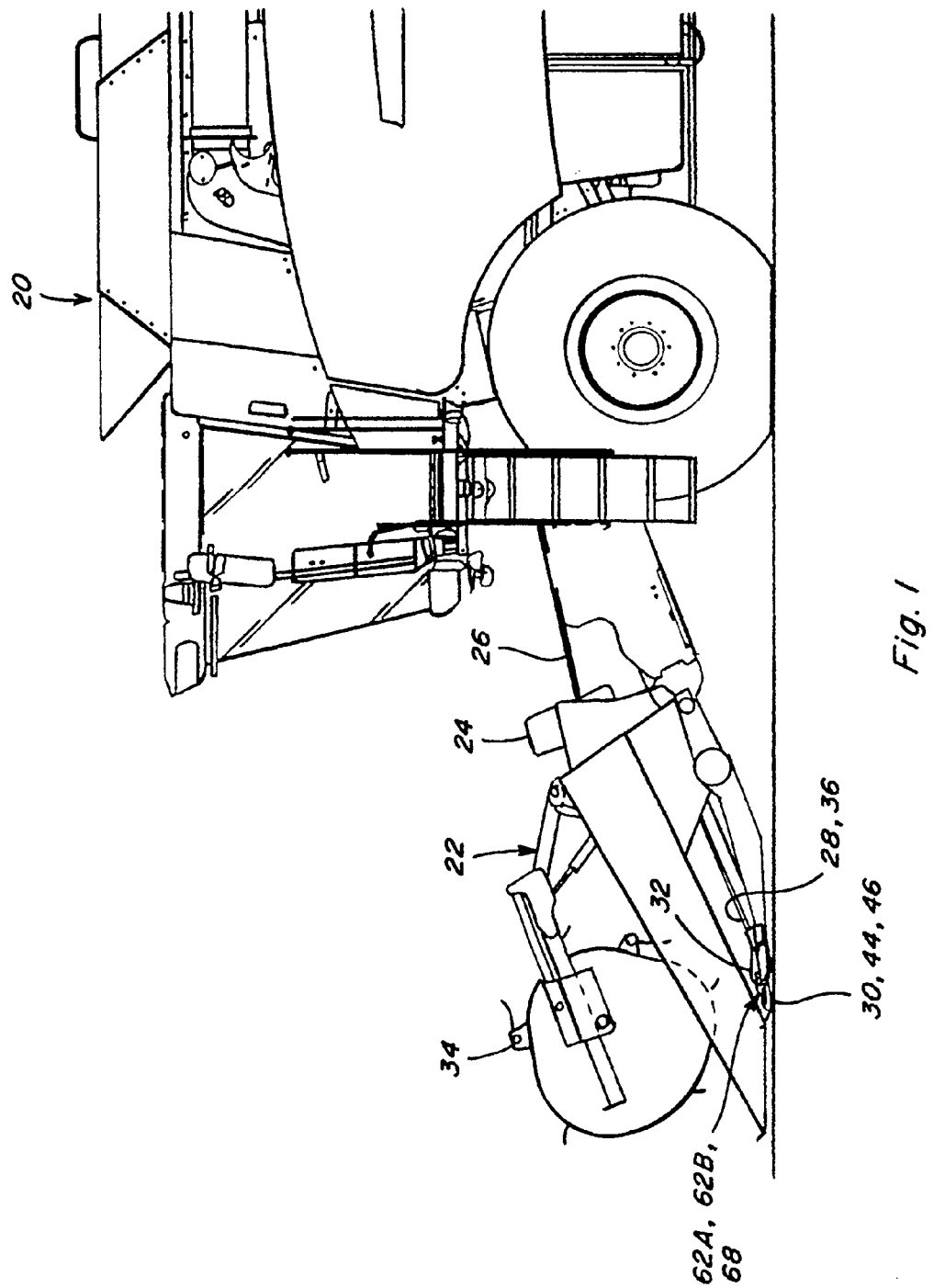
FIG. 1 is a fragmentary side view of a harvester including a header having sickle knife head and arm assemblies according to the invention.

Turning now to the drawings wherein a preferred embodiment of the invention is shown, in FIGS. 1 through 5, a conventional, well known agricultural cutting machine, which is a combine 20, is shown including a header 22. Header 22 is shown supported in the conventional, well-known manner on a forward end 24 of combine 20, and is operable for cutting or severing crops such as, but not limited to, small grains such as wheat and soybeans, and inducting the severed crops into a feeder 26 for conveyance into combine 20 for threshing and cleaning, in the well known manner, as combine 20 moves forwardly over a field.

Header 22 includes a pan or floor 28 which is supported in desired proximity to the surface of the field during the harvesting operation, and an elongate, sidewardly extending sickle 30 along a forward edge portion 32 of floor 28, sickle 30 being operable for severing the plants or crop for induction into header 22, as will be explained. Header 22 additionally includes an elongate, sidewardly extending reel 34 disposed above sickle 30 and rotatable in a direction for facilitating induction of the severed plant material or crops into header 22. Here, header 22 is configured as a draper type, having a system of elongate, flat, sidewardly moving draper belts 36 and 38 having upwardly facing surfaces disposed just rearwardly of forward edge portion 32, operable in cooperation with reel 34 for conveying the severed plant material or crops toward an inlet opening of feeder 26 for induction into combine 20, in the well-known manner.

Referring more particularly to FIG. 3, sickle 30 extends in a sideward direction along the width of floor 28, between a first side edge portion 40 of the floor, and an opposite second side edge portion 42. Sickle 30 includes an elongate, sidewardly extending first cutter bar assembly 44, and an elongate, sidewardly extending second cutter bar assembly 46 extending in end to end relation to cutter bar assembly 44, cutter bar assemblies 44 and 46 being supported in substantially longitudinally aligned relation adjacent to forward edge portion 32 of floor 28.

Figure 4:
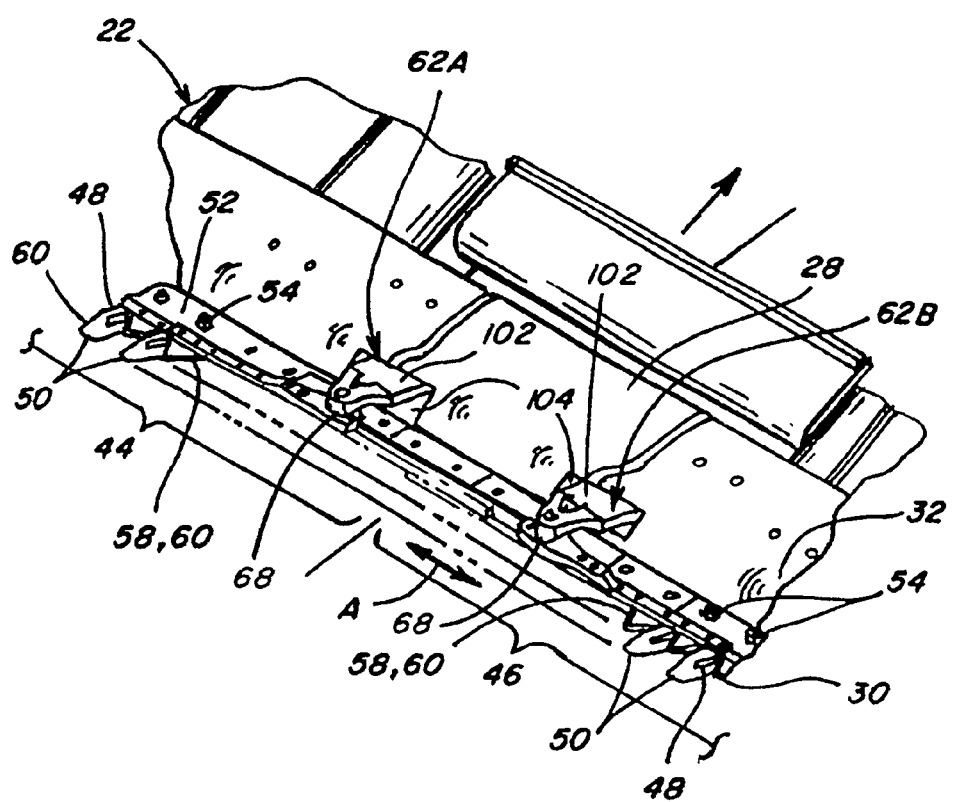
FIG. 4 is a fragmentary perspective view of the header, showing aspects of the sickle knife head and arm assemblies.
Figure 5:
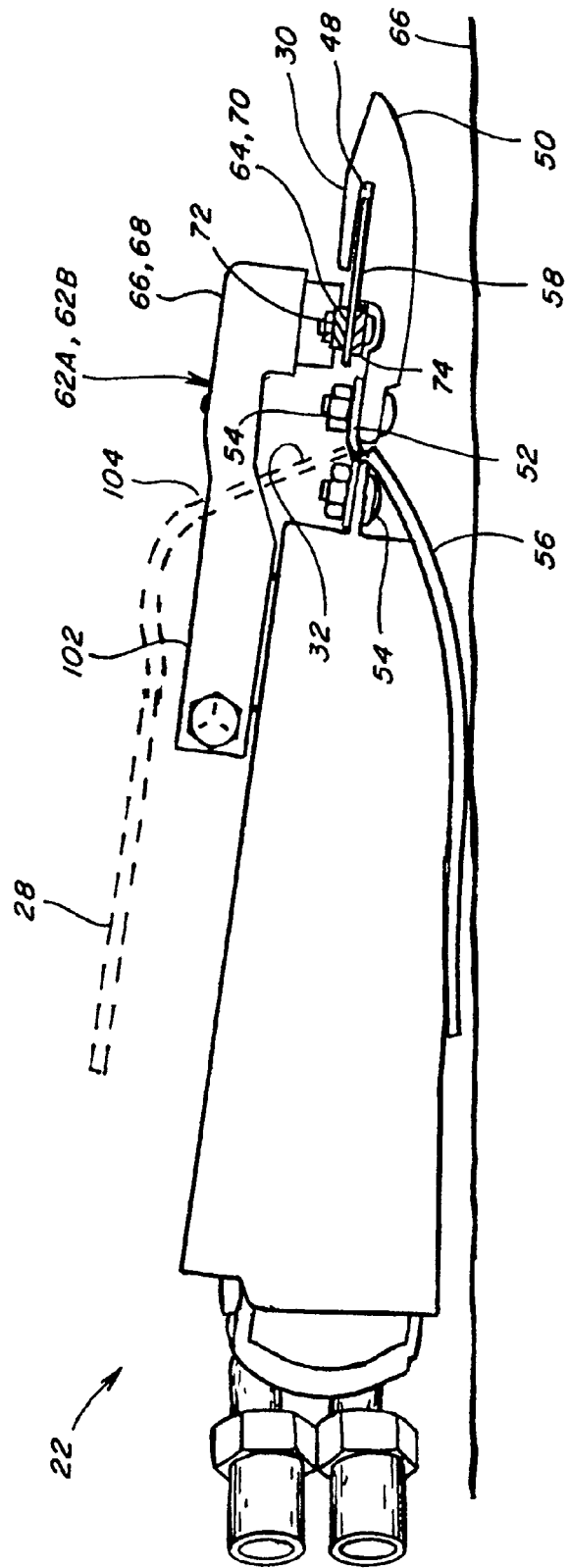
FIG. 5 is an enlarged side view showing aspects of the header, sickle drives, and the sickle knife head and arm assemblies.
Figure 6:
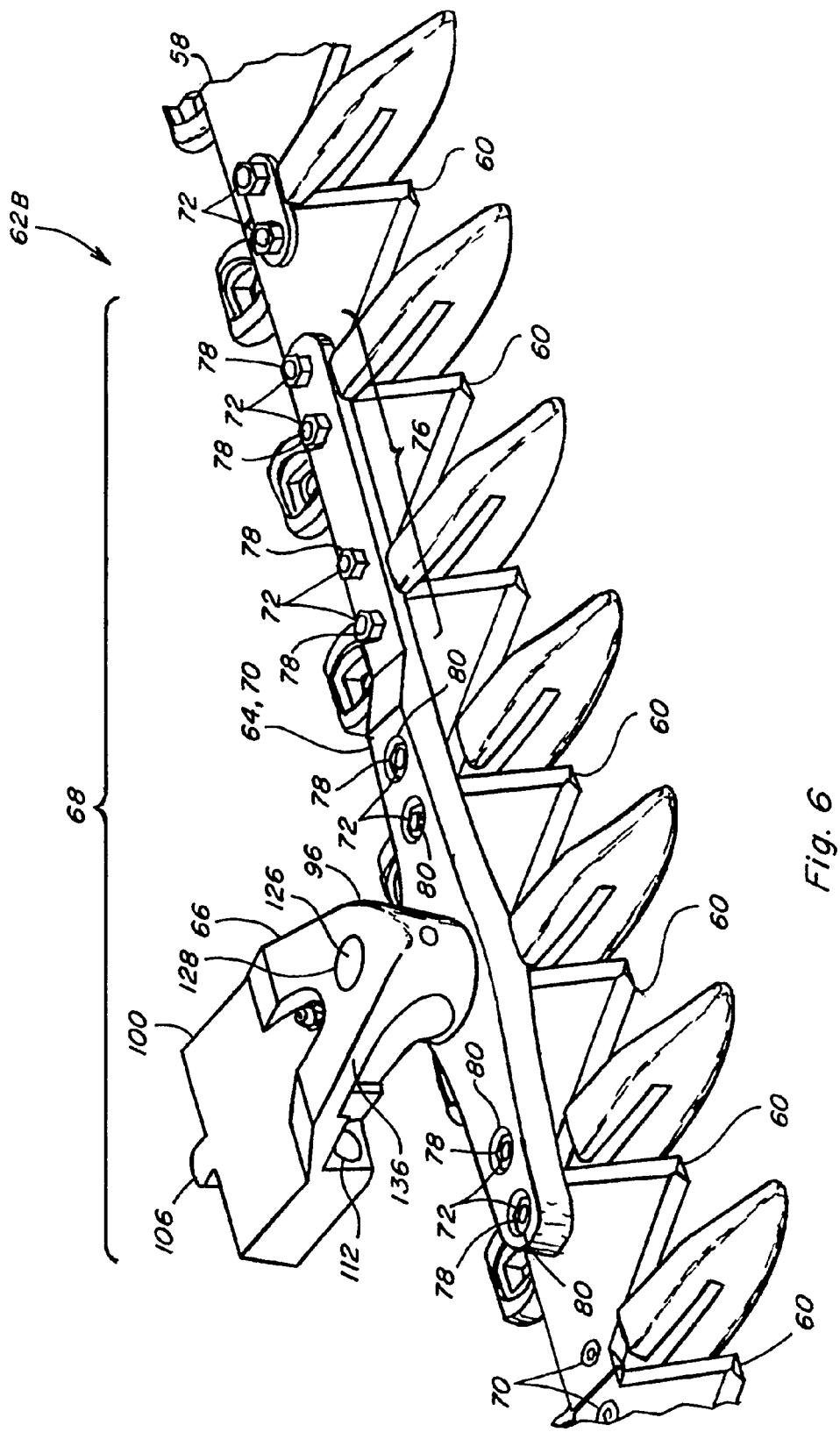
FIG. 6 is a fragmentary perspective view of the sickle, showing one of the knife head and arm assemblies.

Referring more particularly to FIGS. 4 and 5, cutter bar assemblies 44 and 46 each include a plurality of sidewardly facing aligned slots 48 through a sidewardly extending array of guards 50 which project forwardly from a stationary bar 52 at sidewardly spaced intervals therealong. Stationary bar 52 extends the length of sickle 30 just forwardly of forward edge portion 32 of floor 28, and guards 50 are mounted to bar 52 with fasteners 54. Bar 52, in turn, is mounted to a frame 56 of header 22 adjacent to forward edge portion 32 by fasteners 54, as best illustrated in FIG. 5. Each of cutter bar assemblies 44 and 46 supports an elongate knife assembly 58 for reciprocating longitudinal movement within slots 48, each knife assembly 58 having a row of knife sections 60 including oppositely facing, angularly related knife edges which, in conjunction with adjacent guards 50, effects a shearing or cutting action which severs plant stems and stalks or other material captured between the knives and the guards as the knife sections are reciprocatingly moved sidewardly, as denoted by arrow A in FIG. 4.

Knife assemblies 58 are reciprocatingly driven utilizing first and second sickle drives 62A and 62B. First and second sickle drives 62A and 62B are illustrated in FIGS. 3 and 4 at a center location on header 22 between side edge portions 40 and 42 at the opposite ends of the header, although it should be noted that it is contemplated that sickle drives 62A and 62B could alternatively be utilized at other locations on a header, and that multiple sickle drives 62 could be used at multiple locations on a header. Sickle drives 62A and 62B are preferably located completely within or beneath floor 28 as best shown in FIG. 5, to reduce interruption of flow of cut plant material thereover and thereabout. Drives 62A and 62B can comprise a variety of mechanisms, such as, but not limited to, epicyclical drives that impart purely linear sideward motion, or pivoting sideward motion, to the knife head assemblies, as desired or required for a particular application. The disclosures and teachings of Priepke U.S. Pat. Nos. 7,810,304; 7,805,919; 7,730,709; 7,520,118; and 7,401,458, are hereby incorporated by reference herein in their entireties, as representative non-limiting examples of drives that can be utilized with the present invention.

Sickle drives 62A and 62B include drive elements 102 that project forwardly through slots 104 or other openings in or in the vicinity of forward edge portion 32 of floor 28, for connection to the respective knife assemblies 58, and which are moved in a side to side reciprocating motion by the respective drive, for effecting the cutting action. Header 22 includes knife heads 64 and knife arms 66 cooperatively arranged in knife head and arm assemblies 68 constructed and operable according to the present invention, connecting drives 62A and 62B in driving relation with respective knife assemblies 58. As is evident from the location of knife head and arm assemblies 68, they will be located directly in the path of the rearward flow of cut plant material over forward edge 32 and onto the upper surface of floor 28 during plant cutting operations. As a result, if assemblies 68 are large and/or obtrusive, they can have a plowing effect, causing the plant material to build up forwardly thereof, and/or be split or interrupted, so as to not flow smoothly onto the floor. It is therefore desired to minimize such flow disruptions.

Additionally, as noted above under the Background Art heading, from time to time, the knife sections 60 will be damaged, e.g., broken, chipped, become worn, or for other reasons require removal and replacement. Sometimes, this will be during plant cutting or harvesting, and thus in the field, and it will be desired to accomplish the removal and replacement as quickly as possible, with minimal removal/disassembly of components. It has also been found that a limited amount of relative vertical movement between the drive 62A or 62B and the knife assemblies 58 is desirable to facilitate free reciprocating movement of the knife assemblies, both to accommodate knife wear and flexing if so configured, as illustrated by the flexed cutter bar assemblies 46 and 48, in FIG. 3A.

Referring also to FIGS. 6 through 13, knife head and arm assemblies 68 each comprise an elongate member 70 attached by an array of threaded fasteners 72 to an elongate structural beam 74 (FIGS. 5, 10, 11, and 12) underlying the respective knife head assembly 58 of the sickle cutter. Several of knife sections 60 of the respective knife assembly 58 are disposed between beam 74 and member 70, so as to be clamped or captured by this attachment, while the other knife sections 60 of the knife assembly are mounted in the well known manner using additional fasteners 72 for direct attachment to beam 74. Features of knife head 64 include controlled or limited vertical flexibility, which provides an ability to bend or flex to a limited extent with portions of a sickle attached thereto. This capability is preferably achieved by reducing the vertical height or extent of at least one longitudinal end 76 of member 70 relative to a middle or opposite end, as denoted by heights H1 and H2 in FIG. 12, resulting in a stepped shape, although it should be recognized that a tapered or other shape that imparts desired flexibility can alternatively be used. Fasteners 72 here comprise bolts which are inserted from below and extend upwardly through mating holes in beam 74, knife sections 60 and knife head 64, at the top of which they threadedly engage nuts 78. On end 76, nuts 78 are located on top of member 70. On the thicker region, nuts 78 are located in upwardly facing sockets 80 recessed into the top surface of member 70, such that the same length fasteners 72 can be used at both locations if desired. Fasteners 72 are arranged in a spaced apart longitudinally extending array, and are provided in sufficient number, e.g., eight or more, to provide secure attachment to beam 74 for clamping or capturing knife sections 60, and for withstanding shear loads generated by the side to side cutting motion and reciprocating action, which will be longitudinal with respect to member 70.

Figure 12:
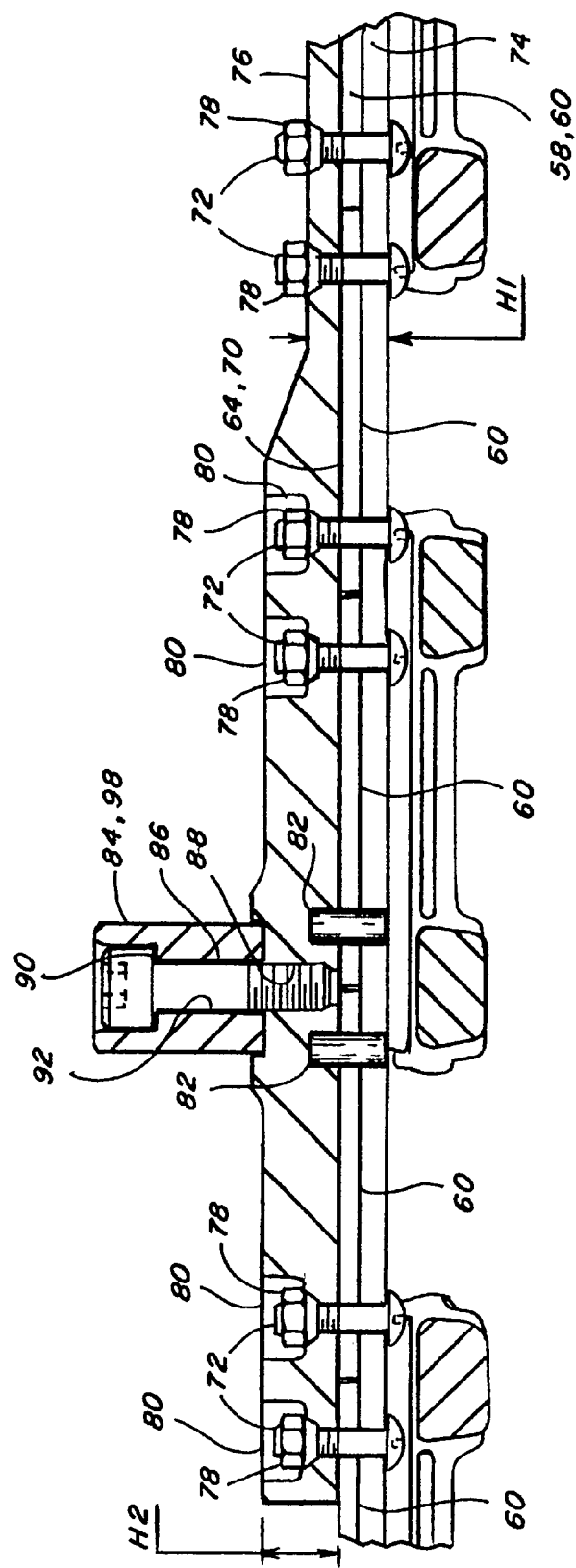
FIG. 12 is a fragmentary sectional view of the sickle, showing one of the knife heads.
Figure 13:
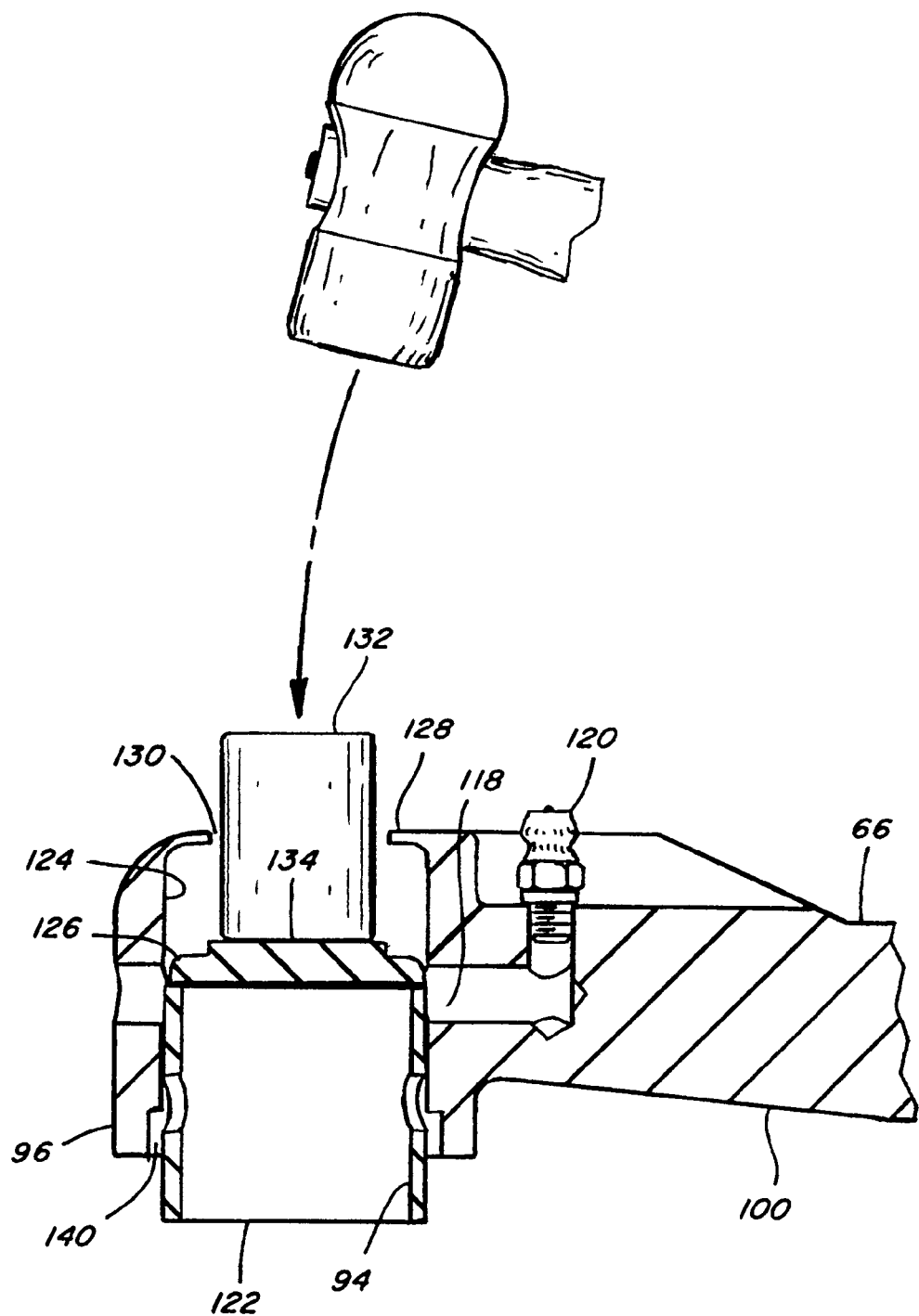
FIG. 13 is another fragmentary sectional view of one of the knife arms, showing removal of a bearing element thereof.

To provide added shear strength and a means to better align the holes of knife head 64, knife sections 60 and beam 74, knife head 64 preferably carries at least one and preferably two downwardly extending pins 82 positioned to be received in aligned holes in one or more of the knife sections and the beam, as shown in FIG. 12. Pins 82 are preferably disposed at a predetermined location corresponding or in close proximity to a knife pin 84 which is positioned for connection to knife arm 66. Knife pin 84 is preferably mounted on the top surface of knife head 64, by a threaded fastener 86 threadedly received in a threaded hole 88 in the upper surface of knife head 64. When fastener 86 is tightened, its head is brought to bear against a shoulder 90 extending about the upper end of a hole 92 through the pin which receives fastener 86. This arrangement allows removal of knife pin 84 from knife head 64 merely by removing fastener 86, without accessing the underside of the knife head or removing it from the sickle.

Knife pin 84 is configured to be cooperatively received in a downwardly open receptacle 94 in a distal end 96 of knife arm 66 for connection to the respective drive 62A or 62B. Here, knife pin 84 has a smooth straight outer bearing surface 98 therearound which is preferably cylindrical shaped and sized to be matingly received in receptacle 94 for up and down movement therein, to facilitate relative up and down movement of knife head 64 and knife arm 66, as denoted by arrows VM in FIG. 11.

Figure 7:
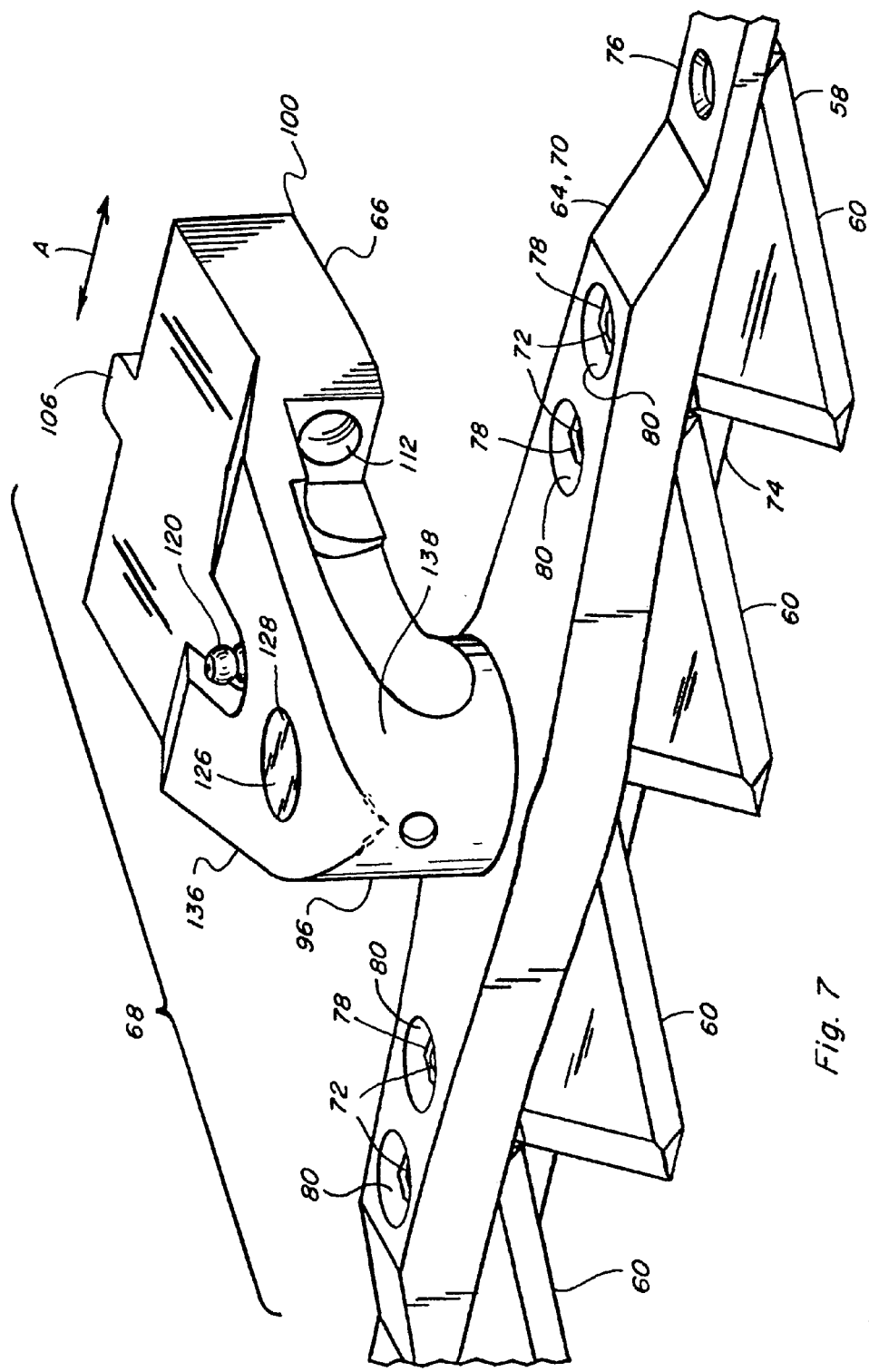
FIG. 7 is another fragmentary perspective view of the sickle, showing one of the knife head and arm assemblies.
Figure 8:
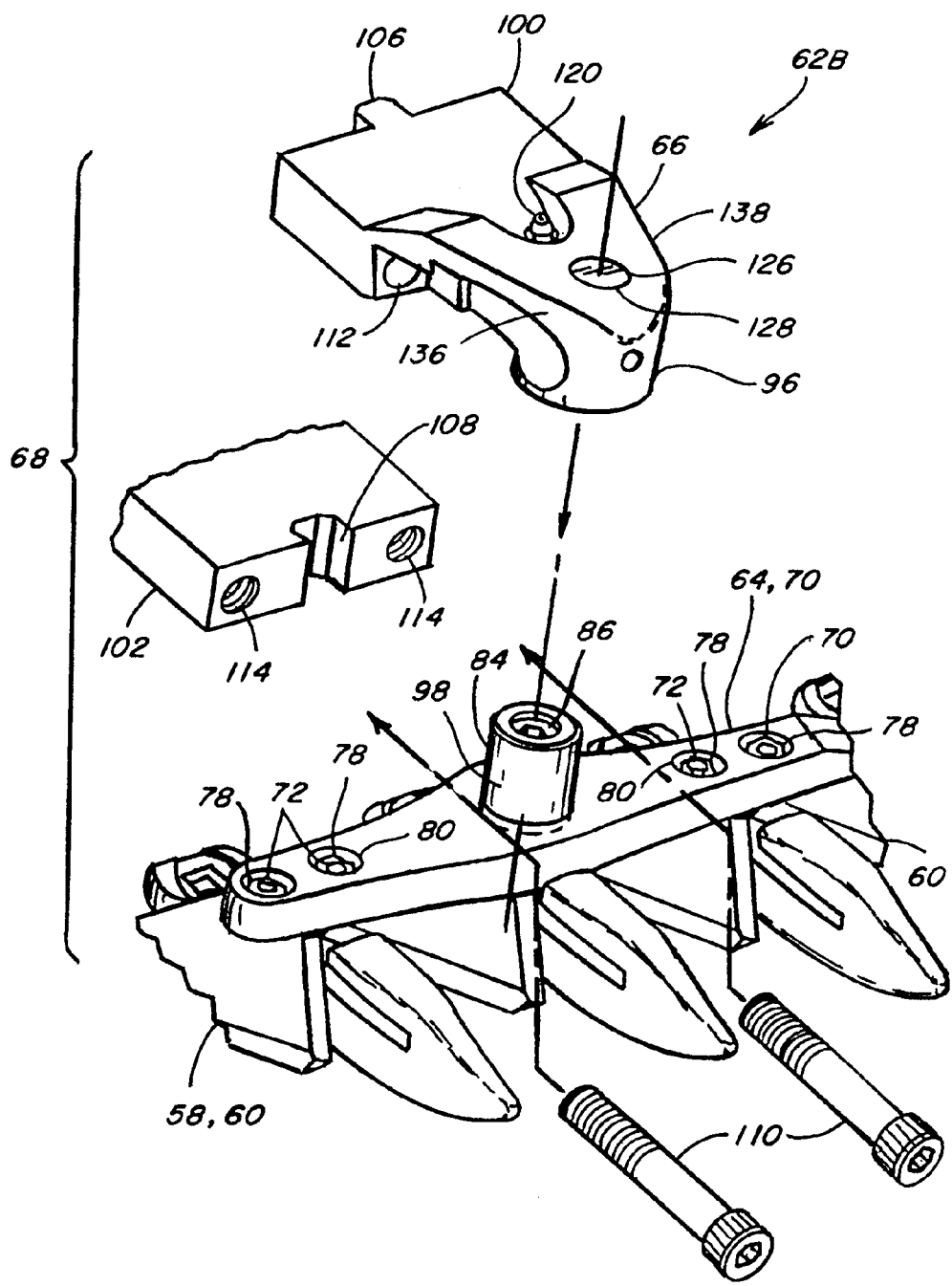
FIG. 8 is a fragmentary perspective view of the sickle, showing aspects of one of the knife head and arm assemblies in exploded form.
Figure 9:
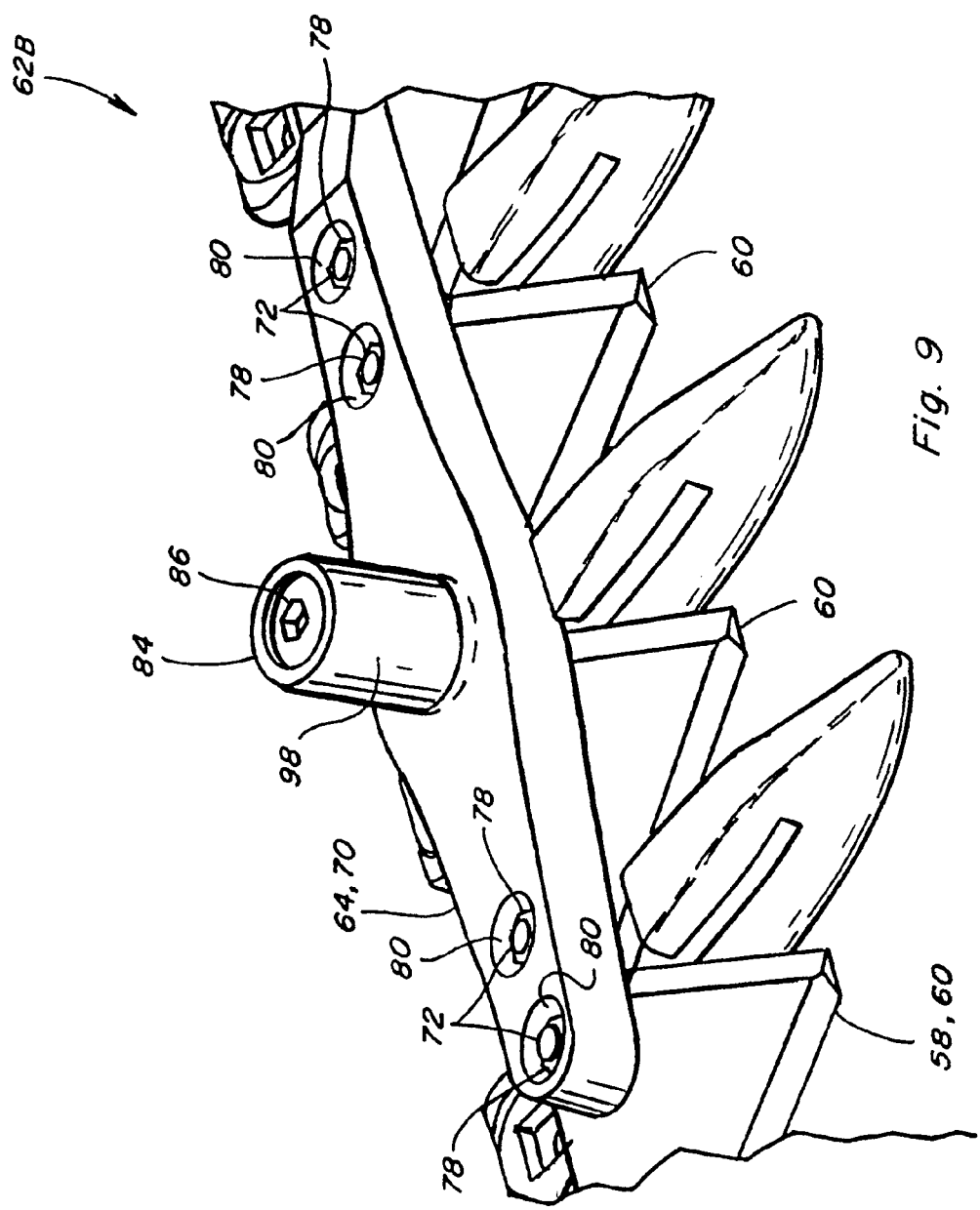
FIG. 9 is a fragmentary perspective view of the sickle and one of the knife heads.
Figure 10:
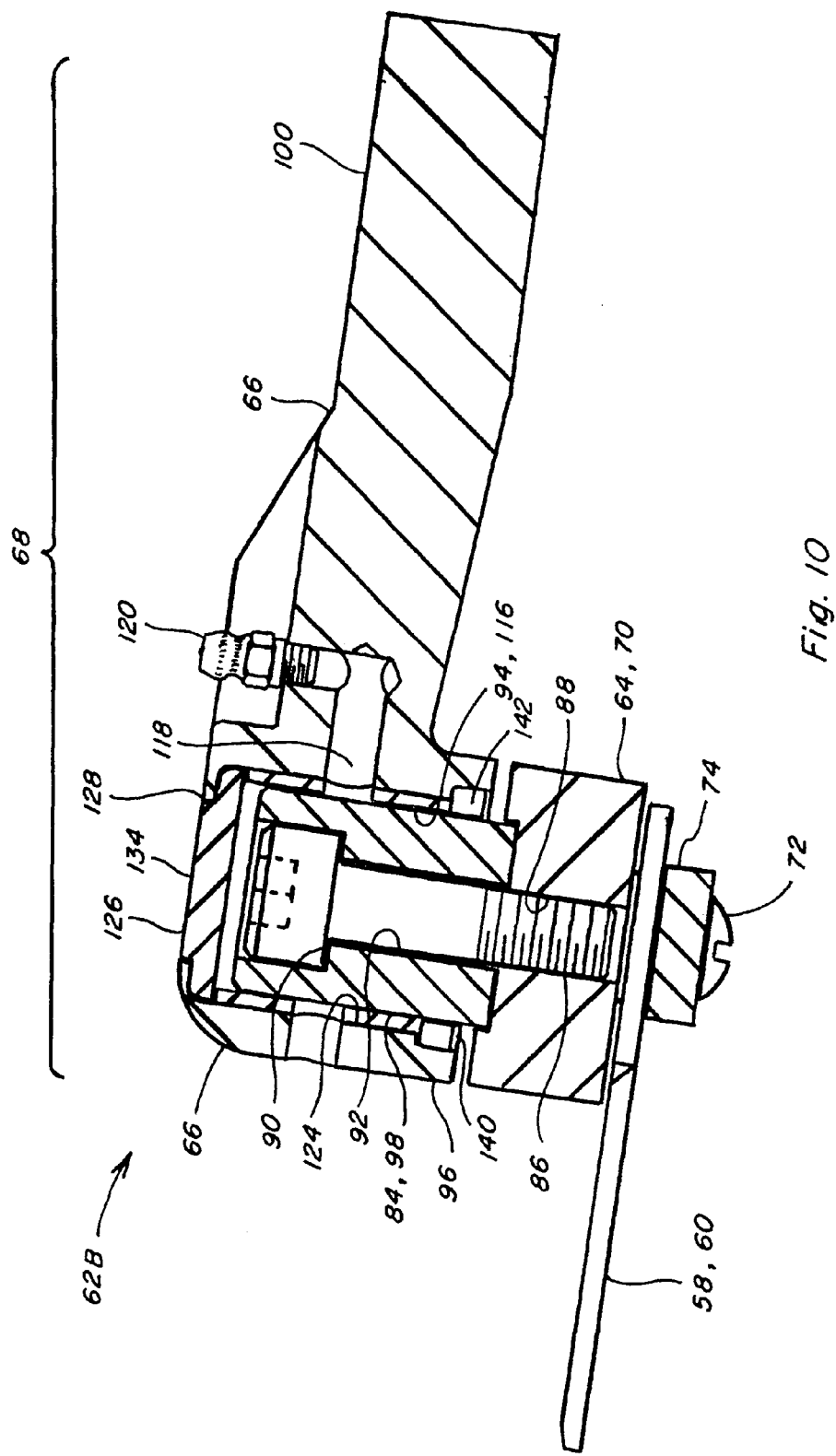
FIG. 10 is a fragmentary sectional view of the sickle, showing one of the knife head and arm assemblies.
Figure 11:
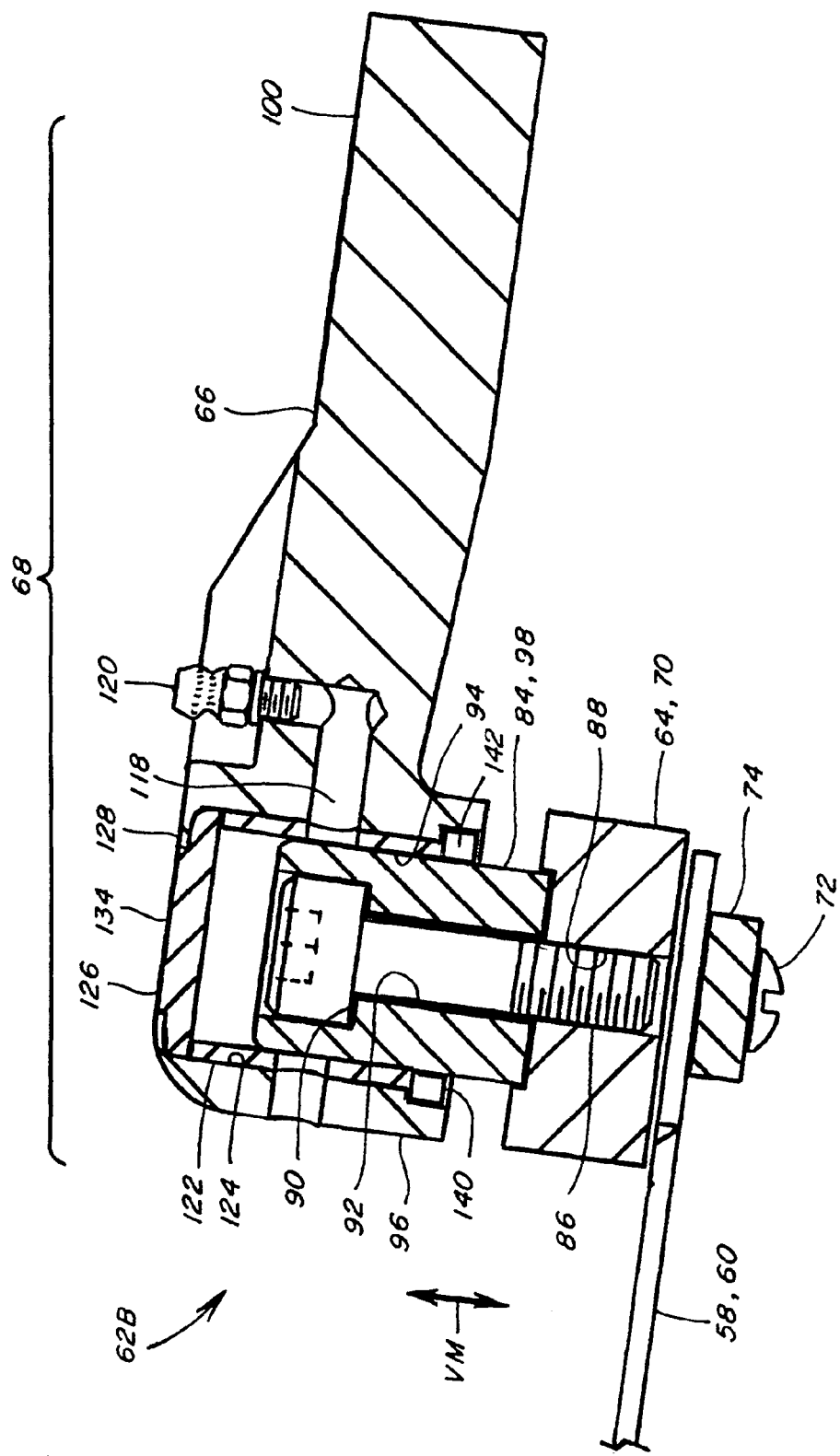
FIG. 11 is another fragmentary sectional view of the sickle, showing one of the knife head and arm assemblies, with vertical separation between the knife head and knife arm.

Knife arm 66 has a mounting end 100 opposite distal end 96, configured for attachment to a drive element 102 of drive 62A or 62B for reciprocating sideward movement therewith, as denoted by arrow A in FIG. 7 (and FIG. 4). Recall here that the movement can be straight side to side or sideward pivoting movement, which will be a function of the type of drive used. Here also, it can be observed that the connection with drive element 102 includes a vertical key 106 which is cooperatively received in vertical keyway 108 in the drive element 102 to provide ease of alignment and strength under side to side shear loading conditions generated by the plant cutting action. Knife arm 66 is held in position on the end of element 102 by threaded fasteners 110 received in holes 112 in arm 66 and threadedly engaged with threaded holes 114 in drive element 102, as illustrated in FIG. 8.

Addressing receptacle 94 of knife arm 66, it is preferably bounded and defined by an inner bearing surface 116 which bounds and defines receptacle 94, and which here is also cylindrical shaped, and sized for receiving knife pin 84. The fit between inner surface 116 and outer surface 98 of the knife pin can be configured to allow relatively free vertical movement between knife arm 66 and knife pin 84, but virtually no lateral play, which vertical movement will be limited to a maximum distance VM (FIG. 11) by the fixed vertical location of knife arm 66 by virtue of its attachment to element 102 of drive 62A or 62B, and the retention of knife head 64, by virtue of attachment to knife assembly 58 and its containment in slot 48 of cutter bar 44 or 46. Both the knife pin and receptacle should be sufficiently robust to handle the repetitive lateral forces that will be generated by prolonged cutting operation of the sickle. It should be noted however, that alternative shapes for outer surface 98 and bearing surface 116 can be used, such as but not limited to, rectangular, square, hexagonal, octagonal, and other polygons. An advantage of the cylindrical shape is that it also allows rotation of the knife head and knife assembly relative to the knife arm about a vertical axis through the knife pin, without tilting of the knife head and knife arm one relative to another.

Thus, for example, if a flexible sickle is employed, it will be able to smoothly flex up and down by virtue of freedom of knife pin 84 to move upwardly and downwardly within receptacle 94, but the knife pin will be restrained against tilting or rocking movements, so as to reduce possible occurrences of binding and resultant increase in power consumption and wear. However, it should be noted that if some relative pivotal or rocking motion is desired or required in the horizontal plane, e.g., to accommodate a flexible cutter, a spherical or partial spherical type bearing or bushing can be employed.

To facilitate the ability of knife pin 84 and receptacle 94 to move freely upwardly and downwardly one relative to the other, and also rotate one relative to the other, knife arm 66 optionally includes an internal grease reservoir 118 configured for holding a quantity of grease for distribution within receptacle 94, and a connecting grease fitting 120 usable for resupplying the grease as required. Alternatively, a grease or lubricant impregnated bushing or the like can be used in receptacle 94 for reducing friction at the interface between the knife pin and knife arm, and within a bearing at that location if used. The lower end and upper end of receptacle 94 is preferably enclosed to prevent entry of contaminants such as dust, dirt and the like into the interface between bearing surface 116 and outer surface 98 and into a bearing if used, a lower opening 140 being sealed with a conventional annular or ring seal 142, and the upper end in a manner discussed below.

It is anticipated that with use, bearing surface 116 of a bearing that includes this surface, and/or the bearing itself, and/or the knife pin, will wear to such an extent as to require replacement. To facilitate replacement, bearing surface 116 of receptacle 94 comprises an inner peripheral surface of a removable bearing element 122, which can comprise for instance a solid or impregnated sleeve or bushing, or a ball, needle, or spherical type bearing, press fit into a cavity 124 through lower opening 140, and the upper end of receptacle 94 is shown enclosed by a removable plug 126 which is also usable for removing the bearing element 122. The ability easily and quickly remove and replace bearing element 122 with tools available in the field is highly desired when harvesting and time is of the essence. In one preferred configuration, plug 126 is located in sealed abutment with a lower surface of a shoulder 128 extending at least partially about and defining an upper opening 130 (FIG. 13) of cavity 124, above bearing element 122 and forming the desired sealed condition against entry of contaminants, moisture, etc. When removal and replacement of bearing element 122 is required, plug 126 can be pressed downwardly, using a press, or, if one is unavailable, e.g., service occurs in the field, suitable tools such as a hammer and a socket 132 or other suitable item of similar diameter to the bearing element and length, can be used to push or tap the plug downwardly through cavity 124, and will also remove the ring seal 142 if used. In both instances, the downward movement of plug 126 will push bearing element 122 downwardly from cavity 124 through lower opening 140. Replacement then entails simply replacing plug 126 in cavity 124 against shoulder 128, and pressing or tapping the bearing element or a new one into position.

Here, it can be observed that cavity 124 and lower opening 140 have a first transverse extent or diameter, that is larger than that of upper opening 130, and that plug 126 has a transverse extent or diameter that is marginally smaller than that of the cavity 124 and lower opening, to facilitate passage of the plug therethrough, but which prevents passage through upper opening 130. Plug 126 can include a protuberance 132 extending upwardly therefrom and configured to sealably mate with and engage shoulder 128 to form the upper sealed condition. The protuberance 132 also strengthens plug 126.

Here, plug 126 is illustrated as having a round disk shape, including protuberance 132, although it should be understood that other shapes that provide the desired advantages can also be used. As non-limiting examples, protuberance 132 and shoulder 128 can have an oval, rectangular, star, or other polygonal shape, as desired or required for a particular application.

Thus, with the knife head and arm assembly of the invention, most of the knife sections 60 clamped to the sickle by knife head 64 can be removed and replaced by removal of just two fasteners 78 and nuts 80, and knife pin 84 can be removed and replaced by removing knife arm 66 (requiring removing just two fasteners 110) and one fastener 86.

In another preferred configuration, as shown in various of the Figures, distal end 96 of knife arm 66 has opposite sides 136 and 138 that taper divergingly toward mounting end 100. This imparts a streamlined shape to each of the knife arms for facilitating flow of plant material thereabout. This taper is preferably embodied in a V-shape or U-shape when viewed from above, extending about distal end 96, and additionally serves to deflect the cut plant material to some extent away from the slots in forward end 32 of floor 28 of the header through which the driven elements of drives 62A and 62B extend.

Here, it should be noted that the knife arm assembly is illustrated and depicted with the cavity and receptacle for receiving the knife pin oriented so as to face downwardly. Although this is the preferred orientation, it should be understood that an upwardly facing orientation can alternatively be used, if desired or required for a particular application.

In light of all the foregoing, it should thus be apparent to those skilled in the art that there has been shown and described a novel knife arm assembly for connecting a sickle knife to a reciprocating drive mechanism. However, it should also be apparent that, within the principles and scope of the invention, many changes are possible and contemplated, including in the details, materials, and arrangements of parts which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

What is claimed is:

1. A knife arm assembly for connecting a sickle knife to a reciprocating drive mechanism, comprising:
  a knife arm having a mounting end configured for attachment to the drive mechanism for reciprocating sideward movement therewith,
  a distal end opposite the mounting end disposed to be supported in cantilever relation to the drive mechanism, the distal end having an inner surface bounding and defining a cavity and a first opening at a first end of the cavity, the first opening and the cavity having a substantially uniform first transverse extent, and a bearing element retained in and occupying a substantial portion of the cavity, the bearing element having an inner bearing surface bounding and defining a receptacle therein and including an open end generally proximate to the first opening,
  a knife pin of a knife head of a sickle for cooperatively engaging the receptacle, wherein the knife pin includes a through hole generally coextensive longitudinally with the knife pin for receiving a fastener therethrough;
  wherein the knife arm has a shoulder extending at least partially about and defining a second opening at a second end of the cavity opposite the first end, and the second opening having a second transverse extent smaller than the first transverse extent, and
  a plug disposed in the second end of the cavity, the plug having a third transverse extent marginally smaller than the first transverse extent but larger than the second transverse extent so as to cover the second opening while being restrained from passage therethrough by the shoulder, and the plug being configured to be forceably movable toward the first end of the cavity and against the bearing element for pressing the bearing element from the cavity through the first opening.

2. The knife arm assembly of claim 1, further comprising a protuberance on the plug disposed in sealed, closing relation to the second opening.

3. The knife arm assembly of claim 2, wherein the bearing element bears against the plug to hold the plug against the shoulder forming a substantially sealed condition thereabout.

4. The knife arm assembly of claim 1, wherein the bearing element is press fit in the cavity.

5. The knife arm assembly of claim 1, wherein the knife arm is removably mounted on a driven element of the reciprocating drive mechanism such that the distal end is disposed in cantilever relation thereto over a knife head of the sickle cutter, with the knife pin of the knife head cooperatively received in the receptacle for rotation and limited vertical movement relative to the knife arm.

6. The knife arm assembly of claim 1, wherein the bearing element has an outer surface thereabout disposed in intimate mating relation with the inner surface defining the cavity.

7. The knife arm assembly of claim 6, wherein the outer surface of the bearing element and the inner surface of the knife arm have mating cylindrical shapes.

8. A knife arm assembly for connecting a sickle knife to a reciprocating drive mechanism, comprising:
   a knife arm having a mounting end configured for attachment to the drive mechanism for reciprocating sideward movement therewith, a distal end opposite the mounting end disposed to be supported in cantilever relation to the drive mechanism, the distal end having an inner surface bounding and defining a cavity and a first opening at a first end of the cavity, the knife arm having a shoulder extending at least partially about and defining a second opening at a second end of the cavity opposite the first end, the first opening and the cavity having a substantially uniform first transverse extent, and the second opening having a second transverse extent smaller than the first transverse extent;
   a plug disposed in the second end of the cavity, the plug having a third transverse extent marginally smaller than the first transverse extent but larger than the second transverse extent so as to cover the second opening while being restrained from passage therethrough by the shoulder;
   a bearing element retained in the cavity and slidably engaged with the inner surface of the cavity and abutting the plug, the bearing element having an inner bearing surface bounding and defining a receptacle therein and including an open end generally proximate to the first opening, the receptacle being configured for cooperatively receiving a knife pin of a knife head of a sickle for relative rotation and end to end movement therein, the plug being configured to be forceably movable toward the first end of the cavity and against the bearing element for pressing the bearing element from the cavity through the first opening.

9. The knife arm assembly of claim 8, wherein the plug is disk shaped and has a protuberance projecting disposed in closing relation to the second opening.

10. The knife arm assembly of claim 9, wherein the bearing element bears against the plug to hold the plug against the shoulder forming a substantially sealed condition thereabout.

11. The knife arm assembly of claim 8, wherein the bearing element is press fit in the cavity.

12. The knife arm assembly of claim 8, wherein the knife arm is removably mounted on a driven element of the reciprocating drive mechanism such that the distal end is disposed in cantilever relation thereto over a knife head of the sickle cutter, with an upstanding knife pin of the knife head cooperatively received in the receptacle for rotation and limited vertical movement relative to the knife arm.

13. The knife arm assembly of claim 8, wherein the bearing element has an outer surface thereabout disposed in intimate mating relation with the inner surface defining the cavity.

14. The knife arm assembly of claim 13, wherein the outer surface of the bearing element and the inner surface of the knife arm have mating cylindrical shapes.

15. A knife arm assembly connecting a sickle cutter to a reciprocating drive mechanism, comprising:
   a knife arm having a mounting end attached to the drive mechanism for reciprocating sideward movement therewith, a distal end opposite the mounting end supported in cantilever relation by a driven element of the drive mechanism, the distal end having an inner surface bounding and defining a cavity and a first opening at a lower end of the cavity, the knife arm having a shoulder extending at least partially about and defining a second opening at an upper end of the cavity, the first opening and the cavity having a substantially uniform first transverse extent, and the second opening having a second transverse extent smaller than the first transverse extent;
   a plug disposed in the second end of the cavity, sealing and enclosing the second opening, the plug having a third transverse extent marginally smaller than the first transverse extent but larger than the second transverse extent so as to be prevented by the shoulder from passing through the second opening;
   a bearing element retained in abutment with the cavity and slidably engaged with the inner surface of the cavity, the bearing element having an inner bearing surface bounding and defining a downwardly open receptacle; and
   a knife pin connected to the sickle cutter and extending upwardly into the receptacle, including an outer bearing surface disposed in intimate contact with the inner bearing surface allowing relative rotation and vertical movement between the knife arm and the knife pin, and a through hole generally coextensive with a length of the knife pin for receiving a fastener for connecting the knife pin to the sickle cutter.

16. The knife arm assembly of claim 15, wherein the plug is configured to be pressed from the second opening toward the first end of the cavity and against the bearing element for removing the bearing element from the cavity through the first opening.

17. The knife arm assembly of claim 15, wherein the plug has a protuberance substantially occupying the second opening.

18. The knife arm assembly of claim 15, wherein the bearing element is frictionally retained in the cavity.

19. The knife arm assembly of claim 15, wherein the plug is disk shaped.

* * * * *